United States Patent
Haltiner, Jr. et al.

(10) Patent No.: US 9,692,079 B2
(45) Date of Patent: Jun. 27, 2017

(54) LAMINATED PLATE REPEATING FUEL CELL UNIT FOR AN SOFC STACK

(75) Inventors: Karl J. Haltiner, Jr., Fairport, NY (US); Charles J. Badura, Penfield, NY (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 582 days.

(21) Appl. No.: 12/538,964

(22) Filed: Aug. 11, 2009

(65) Prior Publication Data

US 2010/0143763 A1    Jun. 10, 2010

(51) Int. Cl.
  *H01M 8/10*   (2016.01)
  *H01M 8/2425*   (2016.01)
  *H01M 8/249*   (2016.01)
  *H01M 8/248*   (2016.01)
  *H01M 8/247*   (2016.01)

(52) U.S. Cl.
  CPC .......... *H01M 8/2425* (2013.01); *H01M 8/247* (2013.01); *H01M 8/248* (2013.01); *H01M 8/249* (2013.01); *Y10T 29/49108* (2015.01)

(58) Field of Classification Search
  CPC ....... H01M 8/247; H01M 8/248; H01M 8/249
  USPC .......................................................... 429/37
  See application file for complete search history.

(56) References Cited

U.S. PATENT DOCUMENTS

| | | | |
|---|---|---|---|
| 7,270,906 B2 * | 9/2007 | Haltiner et al. | 429/463 |
| 7,306,872 B2 * | 12/2007 | Haltiner et al. | 429/456 |
| 2006/0110647 A1 * | 5/2006 | Sherman et al. | 429/38 |
| 2006/0210858 A1 * | 9/2006 | Warrier et al. | 429/32 |
| 2007/0134537 A1 * | 6/2007 | Reisdorf et al. | 429/35 |

* cited by examiner

Primary Examiner — Ladan Mohaddes
(74) Attorney, Agent, or Firm — Joshua M. Haines

(57) ABSTRACT

An improved SOFC repeating fuel cell unit comprising three flat plates and a cell retainer. The three flat plates are metallurgically joined (brazed or laser welded) into a subassembly to which is added the fuel cell and cell retainer (which may also be joined as a second subassembly). Each flat plate performs a specific set of functions and can be optimized for those functions. Since the plates are flat and designed to overlap in loaded areas, the fuel cell unit is not prone to dimensional collapse which eliminates the internal reinforcements of the prior art design. The cell retainer is formed to provide a self-locating and locking feature for the fuel cell and decouples thermal stresses from the thin ceramic fuel cell.

9 Claims, 2 Drawing Sheets

LAMINATED PLATE REPEATING FUEL CELL UNIT FOR AN SOFC STACK

This invention was made with United States Government support under Government Contract/Purchase Order No. DE-FC26-02NT41246. The Government has certain rights in this invention.

TECHNICAL FIELD

The present invention relates to solid oxide fuel cells; more particularly, to repeating fuel cell units for forming a solid oxide fuel cell stack; and most particularly, to a repeating fuel cell unit including substantially planar laminated plates, and to a fuel cell stack formed of such repeating fuel cell units.

BACKGROUND OF THE INVENTION

U.S. Pat. No. 7,306,872 B2, issued Dec. 11, 2007, which is incorporated herein by reference, discloses a modular or repeating fuel cell cassette for forming a repeating unit in a solid oxide fuel cell stack (SOFC). The cassette comprises a housing having an electrode opening; a fuel cell subassembly including an electrode, the subassembly being mounted in the electrode opening such that either a cathode surface or an anode surface is exposed outside the cassette; inlet and outlet openings for providing fuel gas to, and removing spent fuel gas from, the anode surface, and for providing air to, and removing air from, the cathode surface.

The prior art SOFC repeating fuel cell unit is a cassette design comprising two thin sheet metal plates that are stamped and formed, then joined together with a metallurgical bond (laser weld) to form a hollow shell containing the thin fuel cell element. In its simplest form, this design has low mass and a low fabrication cost. However, in practice, the formed parts have very low rigidity and are prone to significant dimensional change by warping at the high operating temp (700° C. to 800° C.) of an SOFC. To mitigate this problem, several parts need to be added to the interior of the cassette to prevent dimensional collapse from compressive loads, which adds mass and cost. In addition, the forming process requires form radii, resulting in loose fitting components and fuel "bypass" channels that can have a significant negative effect on the fuel utilization of the cell. Thus, these bypass channels must be plugged with filler materials which also adds manufacturing complexity and cost. Further, the fuel cell subassembly itself is a load-bearing element of the load stack-up, and the so-called "picture frame", to which the thin ceramic fuel cell is bonded, can induce shear stresses into the fragile cell which can lead to cell damage and reduced fuel cell efficiency.

What is needed in the art is an improved arrangement of plates for a fuel cell cassette wherein the fuel cell itself is isolated from thermal and compressive stresses induced in the metal components, and wherein the undesirable prior art bypass channels are eliminated.

It is a principal object of the present invention to improve reliability of a fuel cell stack.

SUMMARY OF THE INVENTION

Briefly described, an improved SOFC modular or repeating fuel cell unit in accordance with the present invention comprises three flat plates and a cell retainer. The three flat plates are metallurgically joined (brazed or laser welded) into a subassembly to which is added the fuel cell and cell retainer, and interconnects (which may also be joined as a second subassembly). Each flat plate performs a specific set of functions and can be optimized for those functions. Since the plates are flat and designed to overlap in loaded areas, compressive loads are fully supported by these areas and the assembly is not prone to dimensional collapse which eliminates the need for internal reinforcements in prior art cassettes. The cell retainer is formed to provide a self-locating and locking feature for the cell and decouples thermal stresses from the thin ceramic cell.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
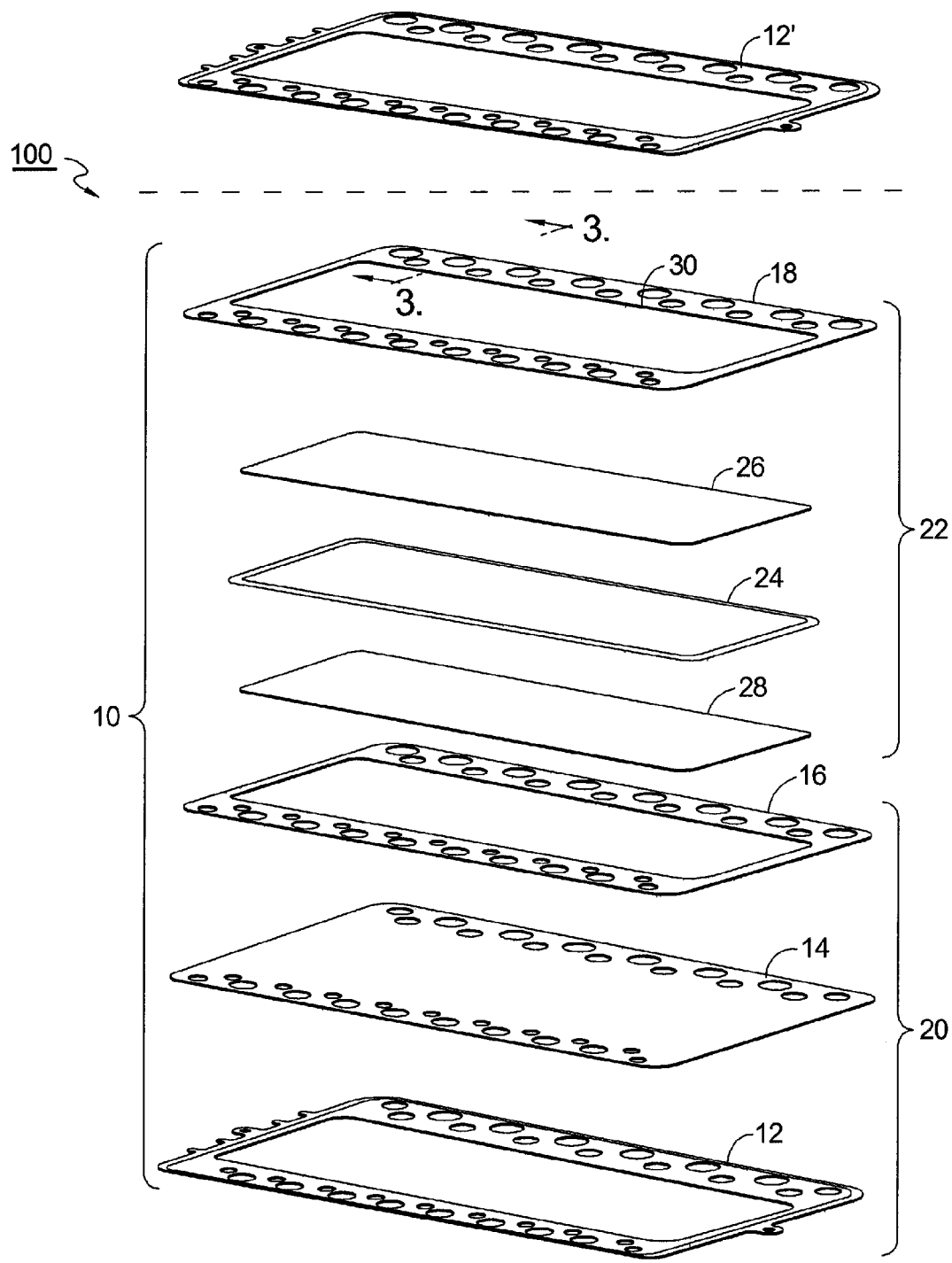
FIG. 1 is a an exploded isometric drawing of an SOFC repeating fuel cell unit in accordance with the present invention.

Referring to FIG. 1, an improved SOFC repeating fuel cell unit 10 in accordance with the present invention comprises three flat plates 12,14,16 and a cell retainer 18. The three flat plates 12,14,16 are metallurgically joined (brazed or laser welded) into a subassembly 20 to which is added a fuel cell subassembly 22 comprising a fuel cell 24 (including an anode, electrolyte, and cathode), a cathode interconnect 26, an anode interconnect 28, and cell retainer 18 (which may also be joined as a subassembly). FIG. 1 shows SOFC repeating fuel cell unit 10 adjacent to the cathode plate 12' of the next adjacent repeating fuel cell unit in a fuel cell stack 100 comprising a plurality of repeating fuel cell units 10.

Each flat plate performs a specific set of functions and can be optimized for those functions. Since the plates are flat and designed to overlap in loaded areas of their respective peripheries, units 10 and stack 100 are not prone to dimensional collapse under load, which eliminates the internal reinforcements required of the prior art design. Cell retainer 18 is formed to provide a self-locating and locking feature 30 for fuel cell 24 and, because of its shape which will be described below, thermal stresses are decoupled from the thin ceramic fuel cell.

The functions of the flat plates are as follows:

Anode plate 16: Provides passage from the anode supply and return chimneys to the active area gas flow field; flow guiding features, seal reinforcing features, interconnect locating features; isolation of the cathode supply and return chimneys; and a cell perimeter supporting surface.

Cathode plate 12: Provides passage from the cathode supply and return chimneys to the active area air flow field; flow guiding features, interconnect locating features; isolation of the anode supply and return chimneys. In one aspect of the invention, the cathode plate may also provide a raised sealing surface for improved sealing between the cathode plate and the cell retainer plate of the adjacent repeating fuel cell unit 10.

Separator plate 14: Defines the anode and cathode supply and return chimneys; encloses anode gas volume within the repeating unit and separates the anode cavity from the cathode cavity; and provides a low-resistance connection between the anode and cathode interconnects 28,26.

Figure 2:
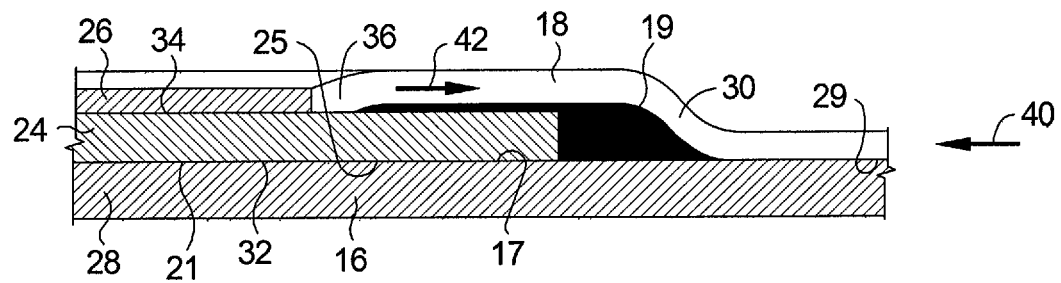
FIG. 2 is a detailed elevational cross-sectional view showing the positioning and engagement of a fuel cell subassembly by the cell retainer plate in the SOFC repeating fuel cell unit shown in FIG. 1.

Cell retainer plate 18: Provides a cell locating feature 30; provides a sealing surface to isolate the anode gas surface 32 of cell 24 from the cathode air surface 34; provides a mechanical clamping feature 36 of cell 24 to anode plate 16; and encloses an anode gas volume within repeating unit 10. Referring to FIG. 2, the cell retaining plate clamping feature 36 provides mechanical retention of fuel cell 24 independent of the sealing feature. In this way, the seal does not have to provide a mechanical bonding function and can be optimized for just sealing. Locating feature 30, formed for example as an offset recess in retainer plate 18, places the sealing surface of the retainer plate in a different plane 42 from the plane 40 of the remainder of retainer plate 18 which is bonded 29 (laser welded) to anode plate 16. In this way, shear stresses in the bonded plates, induced by thermal gradients, are largely decoupled from fuel cell 24 which reduces stress in the cell, significantly lowering the likelihood of failure.

Anode plate 16 has a solid, contiguous surface 17 that supports the perimeter 25 of fuel cell 24 on the anode surface 32. This surface provides the opposing surface for the retaining plate clamping feature 36, and also prevents anode gas from readily flowing into the gap 19 between the cell edge and retaining plate recess form feature. This gap would otherwise provide a fuel gas bypass channel which would divert a substantial portion of the fuel gas away from the active area of the cell and adversely affect the fuel utilization capability of the cell.

The interconnect locating feature of anode plate 16, closely matching the peripheral edge of anode interconnect 28, provides a close fit 21 to the peripheral edge and therefore substantially eliminates another potential fuel gas bypass channel.

The raised sealing surface of cathode plate 12 provides a focused load area for uniform unit loading of the repeating unit glass seal during the sintering process. The edges of the raised surface also provide some mechanical interlocking of the sealing features of the adjacent separator plate and cell retainer, thereby providing additional resistance to shear stresses.

Figure 3:
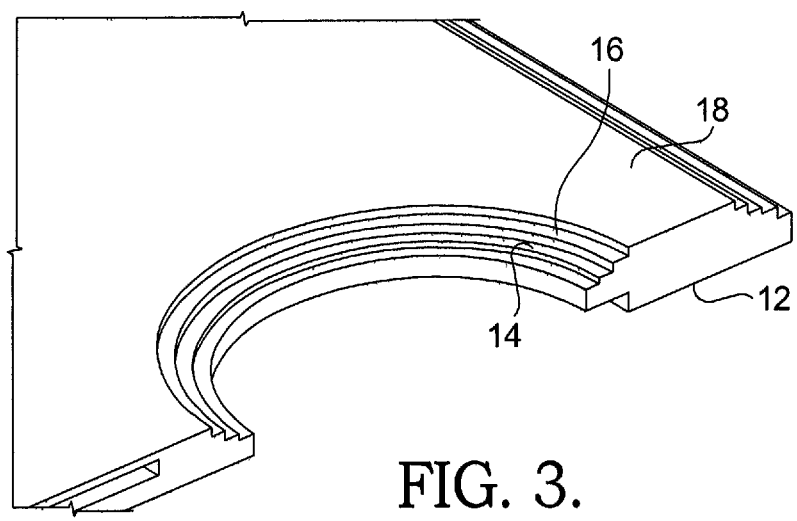
FIG. 3 is an isometric sectioned view of the cell retainer joined to the plate subassembly, taken through a cathode port as shown in FIG. 1 as view 3-3, showing the stepped edges of the joined members, in accordance with the invention.

Preferably, plates 12,14,16 are configured with stepped edges, as shown in FIG. 3, to facilitate laser welding for joining and sealing the plates to each other. The surfaces between the plates are also configured to provide optimum features for braze joints as an alternative joining/sealing process.

An additional feature of the present laminated plate design is that cell retainer plate 18 can easily be configured to accommodate one large cell 24, as shown, or two smaller cells (not shown). Retainer 18 can further be divided into two separate, side-by-side retainers for retaining two smaller cells. This provides flexibility for accommodating the cell manufacturing process; it may be more economical, for example, to produce two smaller cells rather than one large cell. Further, joining two cells into one retainer plate may lead to scrapping two expensive cells if a joint or cell fails, which is avoided with two separate retainers.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A modular fuel cell unit for use in forming a solid oxide fuel cell stack having a plurality of such repeating modular units, comprising:
   a) a planar cathode plate defining a cathode plate surface;
   b) a planar separator plate defining first and second separator plate surfaces, wherein said first separator plate surface is parallel to said second separator plate surface and wherein said first separator plate surface is disposed adjacent to and facing toward said cathode plate surface;
   c) a planar anode plate defining an anode plate surface and a contiguous surface parallel to said anode plate surface, wherein said anode plate surface is disposed adjacent to and facing toward said second separator plate surface;
   d) a cell retainer having a formed opening, said cell retainer defining a cell retainer surface around said formed opening, wherein said cell retainer surface is disposed adjacent to and facing toward said contiguous surface; and
   e) a solid oxide fuel cell disposed adjacent said contiguous surface in said formed opening and captured physically between and positioned directly between said cell retainer and said contiguous surface.

2. A modular fuel cell unit in accordance with claim 1 further comprising a cathode interconnect disposed adjacent a cathode layer of said solid oxide fuel cell.

3. A modular fuel cell unit in accordance with claim 1 further comprising an anode interconnect disposed adjacent an anode layer of said solid oxide fuel cell.

4. A modular fuel cell unit in accordance with claim 1, wherein said cell retainer includes a plate clamping feature for mechanically capturing said solid oxide fuel cell against said anode plate.

5. A modular fuel cell unit in accordance with claim 1, wherein said formed opening is in a first plane spaced apart from and parallel to said cell retainer surface, and wherein a peripheral portion of said cell retainer defines said cell retainer surface which is attached to said anode plate surface.

6. A modular fuel cell unit in accordance with claim 5 wherein said cell retainer includes a plate clamping feature for mechanically capturing said solid oxide fuel cell against said anode plate and said plate clamping feature is disposed on said first plane.

7. A modular fuel cell repeating unit, in which a plurality of said modular fuel cell repeating units are joined together to form a solid oxide fuel cell stack, said modular fuel cell repeating unit comprising:
   a) a planar cathode plate defining a cathode plate surface;
   b) a planar separator plate defining first and second separator plate surfaces, wherein said first separator plate surface is parallel to said second separator plate surface and wherein said first separator plate surface is disposed adjacent to and facing toward said cathode plate surface;

c) a planar anode plate defining an anode plate surface and a contiguous surface parallel to said anode plate surface, wherein said anode plate surface is disposed adjacent to and facing toward said second separator plate surface;

d) a cell retainer having a formed opening, said cell retainer defining a cell retainer surface around said formed opening, wherein said cell retainer surface is disposed adjacent to and facing toward said contiguous surface; and e) a solid oxide fuel cell disposed adjacent said contiguous surface in said formed opening and captured physically between and positioned directly between said cell retainer and said anode plate.

8. A modular fuel cell unit in accordance with claim 1 wherein said solid oxide fuel cell defines a solid oxide fuel cell surface that is parallel to, facing toward, and adjacent to said contiguous surface.

9. A modular fuel cell unit in accordance with claim 5 wherein said solid oxide fuel cell defines first and second solid oxide fuel cell surfaces, wherein said first solid oxide fuel cell surface is parallel to said second solid oxide fuel cell surface, wherein said first solid oxide fuel cell surface is parallel to, facing toward, and adjacent to said contiguous surface, and wherein said second solid oxide fuel cell surface is parallel to and facing toward said first plane.

\* \* \* \* \*